US010257392B2

United States Patent
Nakamura

(10) Patent No.: US 10,257,392 B2
(45) Date of Patent: Apr. 9, 2019

(54) IMAGE FORMATION DEVICE WITH A FUNCTION OF DETERMINING ABNORMALITY REGARDING A READ IMAGE AND A FUNCTION OF PERFORMING MASKING PROCESSING, MANAGEMENT DEVICE, IMAGE FORMATION METHOD, AND NON-TRANSITORY COMPUTER READABLE RECORDING MEDIUM STORING PROGRAM

(71) Applicant: KONICA MINOLTA, INC., Chiyoda-ku, Tokyo (JP)

(72) Inventor: Mitsunori Nakamura, Tokyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/800,769

(22) Filed: Nov. 1, 2017

(65) Prior Publication Data
US 2018/0146119 A1 May 24, 2018

(30) Foreign Application Priority Data

Nov. 17, 2016 (JP) ................................. 2016-224310

(51) Int. Cl.
| | | |
|---|---|---|
| H04N 1/44 | (2006.01) | |
| H04N 1/00 | (2006.01) | |
| H04N 1/387 | (2006.01) | |
| H04N 1/60 | (2006.01) | |

(52) U.S. Cl.
CPC ....... *H04N 1/4493* (2013.01); *H04N 1/00803* (2013.01); *H04N 1/3872* (2013.01); *H04N 1/44* (2013.01); *H04N 1/6036* (2013.01); *H04N 2201/0094* (2013.01)

(58) Field of Classification Search
CPC . H04N 1/4493; H04N 1/00803; H04N 1/3872
USPC ...... 358/1.14, 1.9, 3.24, 1.18, 517, 538, 540
See application file for complete search history.

(56) References Cited

U.S. PATENT DOCUMENTS

| | | | | | |
|---|---|---|---|---|---|
| 5,760,913 | A | * | 6/1998 | Falk ..................... | H04N 1/6033 358/504 |
| 5,937,112 | A | * | 8/1999 | Herregods ........... | H04N 1/3873 358/474 |
| 2007/0296932 | A1 | * | 12/2007 | Suzuki .................. | G03B 27/00 355/18 |
| 2008/0212136 | A1 | * | 9/2008 | Namikata ............. | G06F 3/1288 358/1.16 |
| 2008/0239365 | A1 | * | 10/2008 | Salgado ................ | G06F 17/212 358/1.15 |

(Continued)

FOREIGN PATENT DOCUMENTS

JP 2014-229957 A 12/2014

*Primary Examiner* — Jamares Q Washington
(74) *Attorney, Agent, or Firm* — Buchanan Ingersoll & Rooney PC

(57) ABSTRACT

An image formation device includes an image formation section that forms an image on a transfer medium, and a control section that acquires a read image for which the image formed on the transfer medium is read, the control section has a function of determining abnormality regarding the read image, and a function of performing masking processing on the read image in a case where user content is included in the read image.

36 Claims, 12 Drawing Sheets

(56) References Cited

U.S. PATENT DOCUMENTS

2011/0179961 A1* 7/2011 Yanagawa ............ G06F 3/1208
  101/483

* cited by examiner

IMAGE FORMATION DEVICE WITH A FUNCTION OF DETERMINING ABNORMALITY REGARDING A READ IMAGE AND A FUNCTION OF PERFORMING MASKING PROCESSING, MANAGEMENT DEVICE, IMAGE FORMATION METHOD, AND NON-TRANSITORY COMPUTER READABLE RECORDING MEDIUM STORING PROGRAM

The entire disclosure of Japanese Patent Application No. 2016-224310 filed on Nov. 17, 2016, is incorporated herein by reference in its entirety.

BACKGROUND

Technological Field

The present invention relates to an image formation device, a management device, an image formation method, and a non-transitory computer readable recording medium storing a program, capable of receiving a read image for which an image formed on a transfer medium is read and determining abnormality.

Description of the Related Art

In an image formation device such as a copying machine, a facsimile, a printer or a multifunctional machine that forms an image in an image formation section based on image data, the image is outputted to a transfer medium based on image data included in a job, according to a set image formation condition (an image formation position, a color, a density or the like). In the image formation section, since a characteristic sometimes changes temporarily or gradually accompanying an operation of the image formation device, quality is maintained by various kinds of adjustment operations or the like. Specifically, at every interval of predetermined time during which the image formation device is operated or for every predetermined number of printing paper sheets, a patch or the like to be an adjustment image is formed on a paper sheet, the patch is detected by an inline color density sensor or the like, and whether the image is properly formed is determined.

In addition, in some image formation devices, a printed image is read, and whether the image is properly printed is determined by comparison with the image data used in image formation. When a deviation or the like is generated in image quality or the like as a result of determination, a printing density or the like is corrected by feedback and the image formation is adjusted.

As described above, when a user just instructs adjustment from an operation panel or the like, the paper sheet on which the image is formed is read by an inline sensor or the like, the read image is analyzed, and various kinds of adjustments in the image formation section are automatically performed.

Now, when acquiring a read image in a market, in the case where image abnormality or abnormality that is impossible to adjust occurs, the read image needs to be sampled for analysis. However, in the case where an owner of user content and an operator are different, generally the image including the user content cannot be sampled or preserved due to a security problem. For example, in the case of the adjustment (referred to as real time adjustment, hereinafter) using the image for which an internal pattern is combined with the user content, since the user content is included in the read image, there is a problem that the image cannot be sampled as it is and the abnormality cannot be analyzed.

Japanese Patent Laid-Open No. 2014-229957 proposes an image formation device or the like capable of masking a secret part of a predetermined range. In Japanese Patent Laid-Open No. 2014-229957, a range including confidential information is masked and masking processing propriety needs to be determined even when it is not needed.

SUMMARY

The present invention is implemented with the above-described situation as a background, and one of objects is to provide an image formation device, a management device, an image formation method and a non-transitory computer readable recording medium storing a program, capable of determining whether to perform masking processing according to a situation in a case where user content is included in a read image.

To achieve at least one of the abovementioned objects, according to an aspect of the present invention, an image formation device reflecting one aspect of the present invention includes: an image formation section that forms an image on a transfer medium; and a control section that acquires a read image for which the image formed on the transfer medium is read, and the control section has a function of determining abnormality regarding the read image, and a function of performing masking processing on the read image in a case where user content is included in the read image.

To achieve at least one of the abovementioned objects, according to an aspect of the present invention, an image formation method reflecting one aspect of the present invention includes: acquiring a read image for which an image formed on a transfer medium is read, determining if there is abnormality regarding the read image, and allowing masking processing on the read image in a case where user content is included in the read image.

To achieve at least one of the abovementioned objects, according to an aspect of the present invention, an image formation system reflecting one aspect of the present invention includes: an image formation section that forms an image on a transfer medium; an image read section that reads the image on the transfer medium; and a control section that acquires a read image for which the image formed on the transfer medium is read, and the control section has a function of determining abnormality regarding the read image, and a function of performing masking processing on read image data in a case where user content is included in the read image.

To achieve at least one of the abovementioned objects, according to an aspect of the present invention, an management device reflecting one aspect of the present invention includes: a control section that controls the image formation device, and the control section acquires a read image for which an image on a transfer medium formed in the image formation device is read, determines if there is abnormality regarding the read image, and performs masking processing on the read image in a case where user content is included in the read image.

To achieve at least one of the abovementioned objects, according to an aspect of the present invention, a non-transitory computer readable recording medium storing a program reflecting one aspect of the present invention is non-transitory computer readable recording medium storing a program that causes the computer to acquire a read image for which an image formed on a transfer medium is read, and the program causes the computer to perform determining if there is abnormality regarding the read image, determining if user content is included in the read image, and in a case where the user content is included in the read image, executing masking processing on the read image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
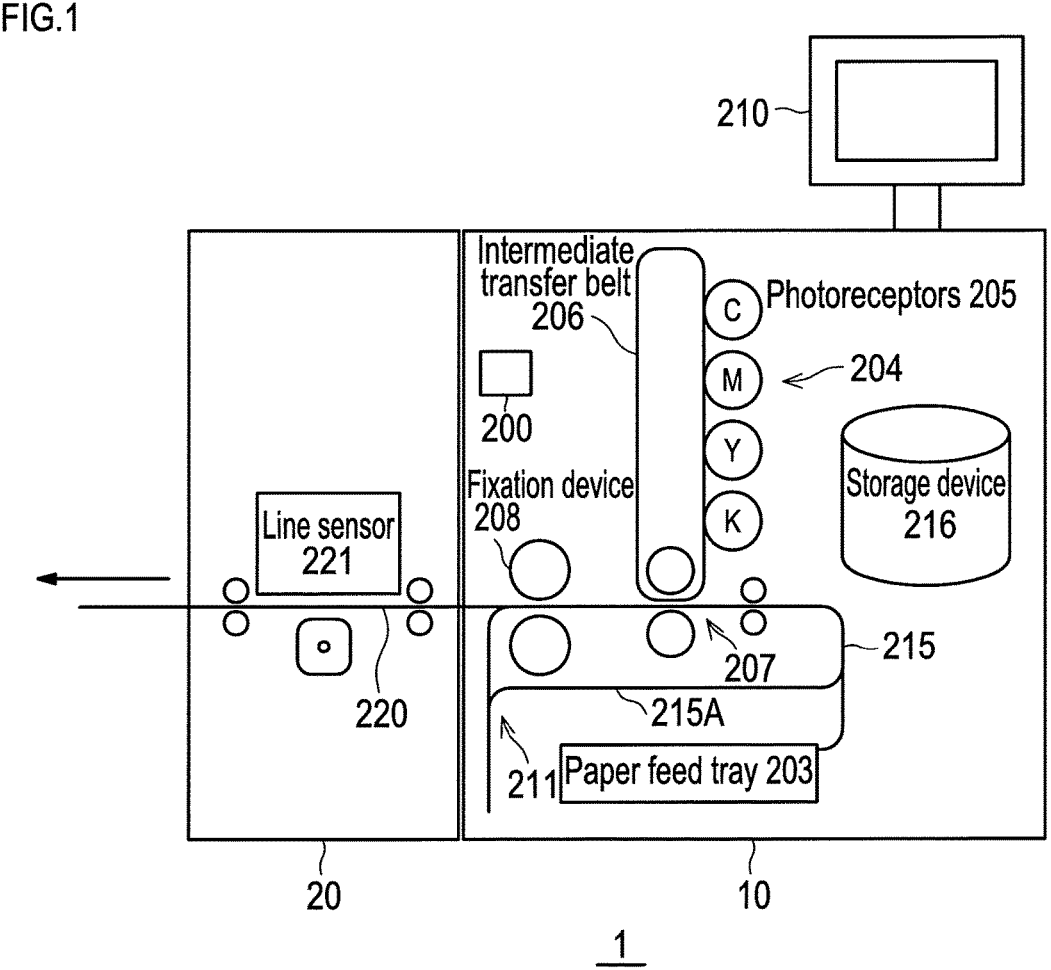
FIG. 1 is a diagram illustrating a schematic configuration of an image formation device in one embodiment of the present invention.

Hereinafter, for an image formation device 1 in one embodiment of the present invention, a mechanical outline will be described based on FIG. 1.

The image formation device 1 includes an image formation device body 10 and a reader 20 connected to the image formation device body 10. Note that, as the present invention, the image formation device can be configured by the image formation device body 10 and the image formation system can be configured by the image formation device body 10 and the reader. In the image formation system, other external devices or the like can be connected further.

On an upper side of the image formation device body 10, at a part where platen glass is not positioned, an operation display section 210 is installed. The operation display section 210 is configured by an LCD and a touch panel, and an operation by a user and display of information are possible. In the present embodiment, the operation display section 210 has functions of both operation section and display section. Note that it is also possible to configure an input section by a mouse or a tablet or the like separately from the display section of the LCD or the like. In addition, the operation display section 210 is usable as an image preservation setting section that sets permission or inhibition of image preservation including user content. The image preservation setting section can be formed of a configuration that instructs the image formation device from outside.

On a lower side of the image formation device body 10, a paper feed tray 203 that stores and feeds paper sheets is arranged. The paper feed tray 203 can be configured in multiple stages. In the present embodiment, the paper sheet corresponds to a transfer medium of the present invention. Note that the transfer medium is not limited to the paper sheet, and can be cloth or the like on which an image can be printed and conveyed, and the material does not matter. In addition, the transfer medium can be a continuous medium in addition to a sheet shape. Furthermore, a feeder can be connected to the image formation device body 10.

Inside the image formation device body 10, a conveyance route 215 that conveys the paper sheet fed from the paper feed tray 203 is provided, and an image formation section 204 is provided in the middle of the conveyance route 215 in the image formation device body 10.

In the image formation section 204, photoreceptors 205 for respective colors, an intermediate transfer belt 206, and a secondary transfer roller 207 are provided, and non-illustrated chargers, LDs and developers are arranged for the respective colors around the photoreceptors 205.

On the conveyance route 215 on a downstream side of the secondary transfer roller 207, a fixation device 208 is arranged. The fixation device 208 is configured by a fixing roller and a fixing belt or the like, and during fixation, a nip is formed by a pressurizing side and a heating side, and the paper sheet is made to pass through.

On the downstream side of the fixation device 208, the conveyance route 215 is extended and connected to a paper passing route 220 of the reader 20. In addition, inside the image formation device body 10, on the downstream side of the fixation device 208, an inversion route 215A is branched from the conveyance route 215 to configure an inversion section 211, and the inversion route 215A joins the conveyance route 215 on an upstream side of the image formation section 204.

In addition, the image formation device body 10 is provided with a control section 200. The control section 200 is configured by a CPU, a control program operated on the CPU, a ROM, a RAM and a nonvolatile memory or the like. The control section 200 controls the entire image formation device, is further capable of acquiring a read image and performing adjustment of an image formation section and determination of abnormality, and is capable of performing masking processing on the read image in the case where user content is included in the read image. Note that the control program can be stored in a movable storage section and distributed. The control section corresponds to a computer in the present invention.

A storage device 216 stores various kinds of data or the like, and can be configured by a nonvolatile memory or an HDD or the like. In addition, the storage device 216 can be also configured by a volatile memory or the like.

The reader 20 is provided with a line sensor 221 that reads a paper sheet on an upper surface of the paper passing route 220. A CCD or a CMOS can be used for the line sensor 221, and as the present invention, the line sensor 221 is not limited to a specific one. In addition, for the sensor, it is not essential that detection is performed on a line, and it is sufficient when a target paper sheet position or image position can be detected. The line sensor 221 corresponds to an image read section in the present invention. The read image of the line sensor 221 is transmitted to the control section 200.

Note that, in the present embodiment, it is described that the image read section is included in the image formation device, but it is also possible that the image read section is provided outside the image formation device and an image formation system is configured as a whole. In that case, the image formation device and a device including the image read section can be connected inline, but they can be also offline. In the offline device, the read image can be acquired in the image formation device by a cable or a network, and data of the read image can be acquired in the image formation device by the movable storage section.

In the image formation section 204, a surface of the photoreceptors 205 is uniformly charged before image write by the charger, the photoreceptors 205, the surface of which is uniformly charged, are irradiated with a laser or the like by an image write section, and an electrostatic latent image is formed on the photoreceptors 205. The developer develops the electrostatic latent image formed on the photoreceptors 205 by toner. By the developing processing, a toner image is formed on the photoreceptors 205. The toner image of the photoreceptors 205 is transferred to the transfer belt 206, and the toner image is transferred to the paper sheet 206 conveyed from the paper feed tray 203 by the secondary transfer roller 207. The paper sheet to which the toner image is transferred is conveyed along the conveyance route 215, and reaches the fixation device 208.

The toner that remains on the photoreceptors 205 and the intermediate transfer belt 206 is removed by a cleaning section not illustrated.

The fixation device 208 fixes the toner image transferred on a front surface side of the paper sheet as an output image by heating the conveyed paper sheet. By the fixation, printing of the image to the paper sheet is completed.

The paper sheet to which fixation processing is executed is discharged as it is to the reader 20 by the conveyance route 215, or made to pass through the inversion route 215A and returned to the conveyance route 215 on the upstream side of the image formation section 204 after front and back of the paper sheet are inverted in the inversion section 211. For the paper sheet, the front and back of which are inverted, the image can be printed on a back surface by the image formation section 204.

Next, the control section and functional blocks around the control section will be described based on FIG. 2.

A state management section 101 controls the entire image formation device 1, and recognizes a state of the entire image formation device 1. The state management section 101 includes non-illustrated ROM storing a program or the like, a RAM to be a work area, a flash memory that nonvolatilely stores data, and a nonvolatile memory or the like. In the nonvolatile memory, an operation parameter of the image formation system, a threshold when read image quality is to be determined, an image formation adjustment condition when the image formation section is to be adjusted, an adjustment image and an internal pattern, etc., are readably stored. They can be edited through the operation display section 210.

To the state management section 101, the operation display section 210 is controllably connected. Various kinds of setting and display of the information can be performed through the operation display section 210, and operation input can be performed as the image preservation setting section that sets the permission or inhibition of the image preservation including the user content. Further, at the operation display section 210, a masked image or an image turned to a masking target can be displayed.

To the state management section 101, the image formation section 204 is controllably connected. In the state management section 101, image data is read from the storage device, and by controlling the image formation section 204, the image is formed on the paper sheet, and an image position adjustment or the like can be performed as needed.

To the state management section 101, an image adjustment section 104 is connected, and the adjustment of the image formation section can be performed based on a result of read in the line sensor 221 and analysis in an analysis section 107 to be described later.

To an input side of the image adjustment section 104, a read section 105 is connected. The read section 105 controls the operation of the line sensor 221, and receives a detection result read in the line sensor 221.

To an output side of the image adjustment section 104, the analysis section 107 is connected. In the analysis section 107, adjustment matter in the image formation section is analyzed and presence/absence of abnormality is determined based on the read image read in the line sensor 221. In addition, in the analysis section 107, a predetermined image position on the paper sheet is specified. The results are transmitted to the state management section 101.

In the state management section 101, whether to perform the masking processing to the read image is determined based on the information. Note that, in the masking processing, it is sufficient when the information in a pertinent area is in an unreadable state, and examples are making the information unreadable by addition of an image (such as blackening) and deleting the pertinent area. In addition, a mask can be prepared in a different layer and the unreadable state can be attained by overlapping the layer. Note that, in the masking processing, the masked image and the image before masking can be held respectively.

To the state management section 101, a log preservation section 108 is controllably connected, and the storage device 216 is connected to the log preservation section 108. In the log preservation section 108, a command of the state management section 101 is received, and whether to preserve predetermined data is determined, and the predetermined data is stored in the storage device 216 when the predetermined data is to be preserved.

Figure 2:
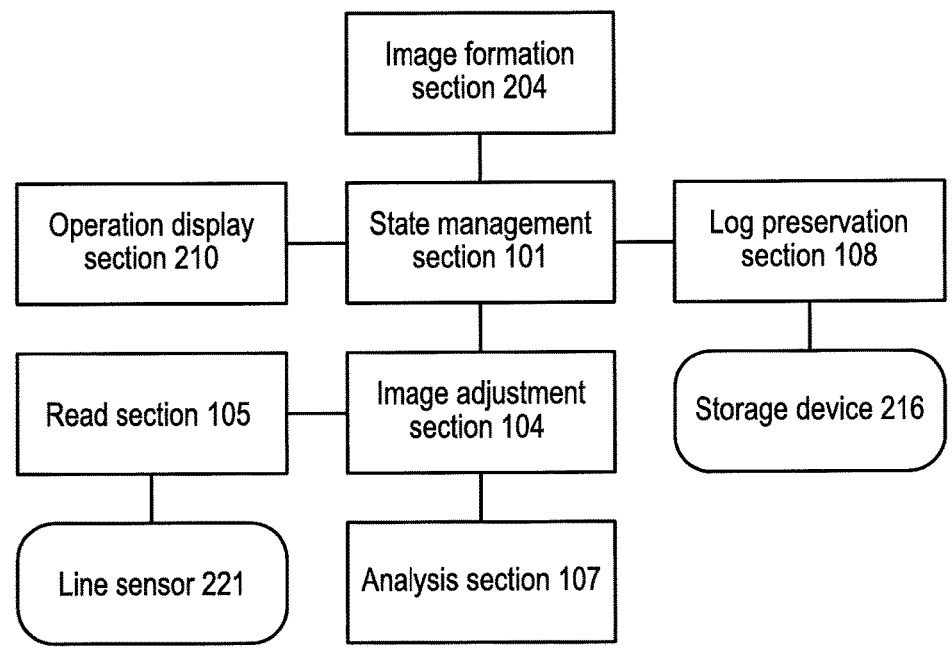
FIG. 2 is a diagram illustrating a control block, similarly.

The functional blocks in FIG. 2 are included in the control section 200, except the image formation section 204, the display section 210 and the line sensor 221.

Embodiment 1

Figure 3:
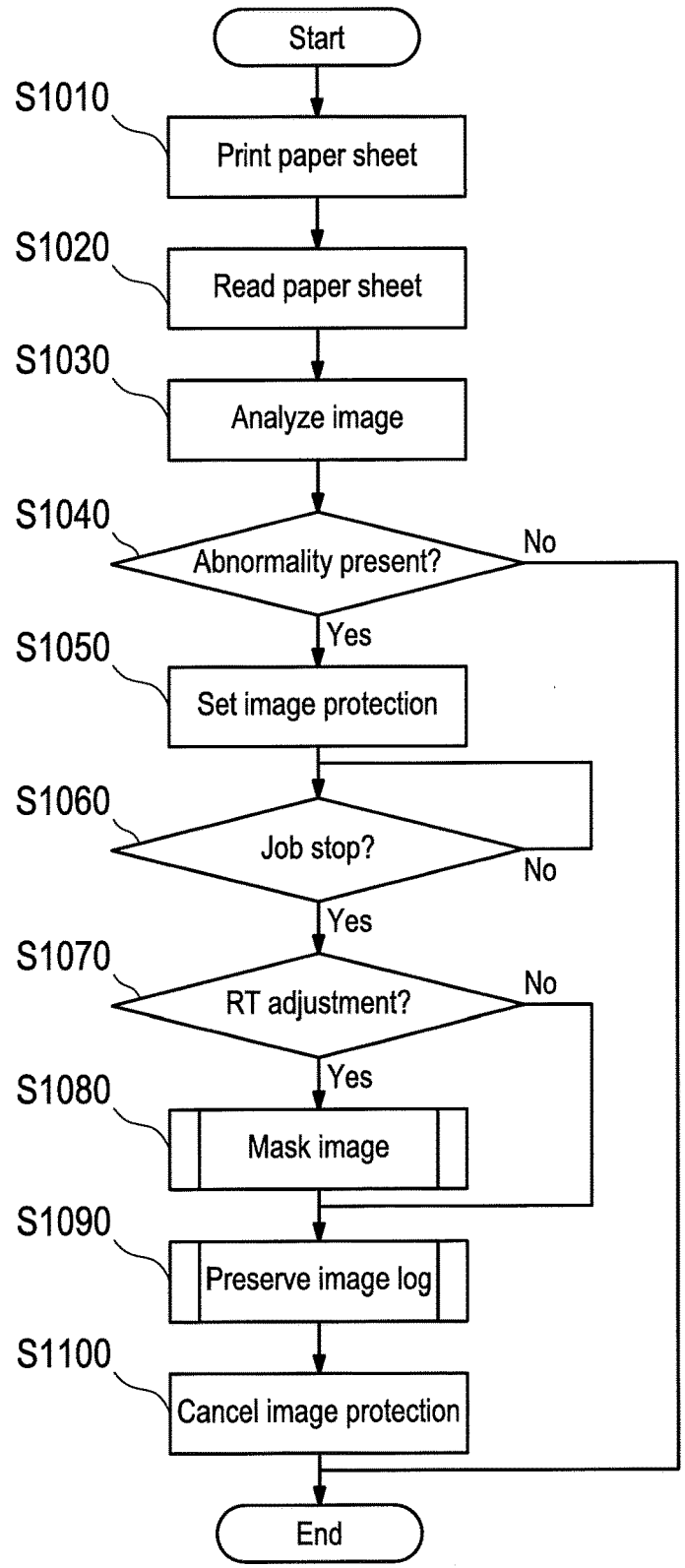
FIG. 3 is a flowchart illustrating a procedure from image formation to image read and masking processing in an embodiment 1, similarly.

Next, one form of a procedure by image formation and image read in the image formation device of the present embodiment will be described based on a flowchart in FIG. 3. Note that the following procedure is executed by control of the control section. In addition, the procedure of the flowchart hereinafter is operated according to setting content indicated in Tables 1 to 6 to be described later.

S1010: Print Paper Sheet

As the procedure is started, the state management section 101 instructs the image formation section 204 to form an image on a paper sheet, based on print job setting. In the case where an adjustment mode is real time adjustment, the user content and an adjustment pattern (a register mark/patch outside a cutting register mark; corresponding to an adjustment image) are printed (see FIG. 6), and in the case of the other adjustment, a corresponding adjustment pattern (corresponding to the adjustment image) is printed. The state management section 101 instructs the adjustment mode of the image formation section to the image adjustment section 104. Next, the procedure shifts to step S1020.

S1020: Read Paper Sheet

In step S1020, the image adjustment section 104 instructs the read section 105 to read the paper sheet on which the image is formed in step S1010. The read section 105 reads the conveyed paper sheet by the line sensor 221, and stores the read image in a memory. When storage of the read image in the memory is completed, the read section 105 notifies the image adjustment section 104 of read completion. Next, the procedure shifts to step S1030.

S1030: Analyze Image

In step S1030, the image adjustment section 104 notifies the analysis section 107 of a memory address of the read image and the adjustment mode, and instructs the analysis. The analysis section 107 searches the paper sheet position on the read image, and searches the adjustment pattern such as the register mark or patch of the read image based on the adjustment mode (illustrated in Table 2). Next, the procedure shifts to step S1040.

S1040: Abnormality Present?

In step S1040, the analysis section 107 determines if there is the abnormality regarding the read image. In the case where there is the abnormality in the adjustment pattern and in the case where there is the abnormality in the image (such as a scratch or a stain), the analysis section 107 notifies the image adjustment section 104 of the abnormality presence. In the case where there is no abnormality, the analysis section 107 calculates an adjustment value and notifies the image adjustment section 104. In the image adjustment section 104, the image formation section 204 is adjusted based on the adjustment value. Examples of the case where there is the abnormality in the adjustment pattern are the case where the adjustment pattern cannot be read and the case where an adjustment range is exceeded or the like in a read result and the adjustment of the image formation section cannot be performed or the like. In the case where there is no abnormality (step S1040, No) in step S1040, after processing is ended, the procedure is ended. In the case where there is the abnormality (step S1040, Yes), the procedure shifts to step S1050.

S1050: Set Image Protection

In step S1050, the image adjustment section 104 sets the read image for which the abnormality presence is determined to image protection setting=protected (illustrated in Table 3), and the read image is set so as not to be deleted from the memory. It is to prevent overwrite with the read image of following paper. Next, the procedure shifts to step S1060.

S1060: Job Stop?

In step S1060, the image adjustment section 104 notifies the state management section 101 of an adjustment failure or the abnormality of the image and the memory address of the read image. The state management section 101 starts job stop processing, instructs the image formation section 204 to stop image formation, and stands by until all the paper sheets are discharged to the outside of the machine. After the job is stopped, the state management section 101 notifies the log preservation section 108 of the memory address of the read image and the adjustment mode, and instructs read image preservation and machine state log preservation.

Note that, as the present invention, when there is the abnormality, the job can be continued without stopping the job or printing can be performed again.

Next, the procedure shifts to step S1070.

S1070: RT Adjustment?

In step S1070, the log preservation section 108 determines if the adjustment mode is the real time adjustment. When it is not the real time adjustment (step S1070, No), the procedure shifts to step S1090, and when it is the real time adjustment (step S1070, Yes), the procedure shifts to step S1080.

S1080: Mask Image

In step S1080, the log preservation section 108 executes the masking processing to the read image in the case of the adjustment mode=the real time adjustment. Details of the masking processing will be described in step S2010 and thereafter. In the present embodiment, whether to perform the masking processing is determined according to an image adjustment mode (the real time adjustment: printing the adjustment pattern on an outer side to be cut). In the case of the adjustment other than the real time adjustment, a chart including the user content is not used and an internal pattern is used so that a scan image can be preserved without being processed.

Next, the procedure shifts to step S1090.

S1090: Preserve Image Log

In step S1090, the log preservation section 108 acquires the read image and a machine state log. The details of the processing will be described in S3010 and thereafter.

Note that, the preservation of the read image/machine state log can be automatic preservation when the abnormality occurs or sampling by a user instruction from a panel.

In the present embodiment, the adjustment mode of the image formation device is discriminated, a masking process is performed and the scan image is preserved in the adjustment to add the adjustment pattern to a user content image, and the scan image is preserved without performing the masking process in the case of the other adjustment.

Next, the procedure shifts to step S1100.

S1100: Cancel Image Protection

In step S1100, after the read image preservation and the machine state log preservation are completed, the log preservation section 108 sets the read image to image protection setting=unprotected (Table 3), deletes the read image from the memory, and ends the procedure.

Figure 4:
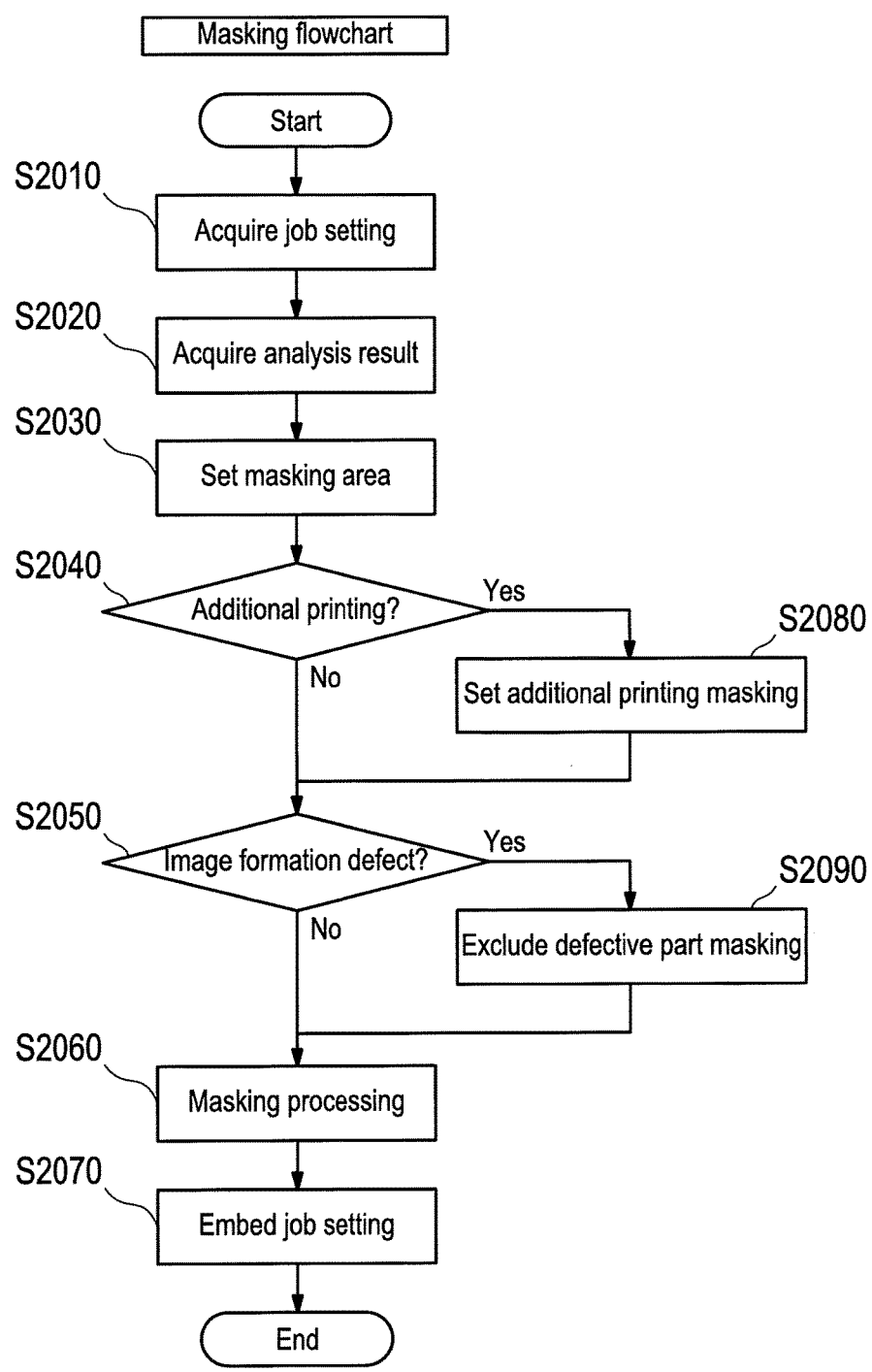
FIG. 4 is a flowchart illustrating a procedure in the masking processing, similarly.

Next, the procedure of the masking processing will be described based on a masking flowchart in FIG. 4. Note that the following procedure is executed by the control of the control section.

S2010: Acquire Job Setting

As the processing is started, in step S2010, the log preservation section 108 acquires job setting of the paper sheet corresponding to the read image from the state management section 101. The job setting includes a paper sheet size, post-processing setting, and the adjustment mode or the like. Next, the procedure shifts to step S2020.

S2020: Acquire Analysis Result

In step S2020, the log preservation section 108 acquires an analysis result of the read image from the analysis section 107. The analysis result includes the paper sheet position on the image, a position of the adjustment pattern, a defect position and a defect size of the image formation or the like. Next, the procedure shifts to step S2030.

S2030: Set Masking Area

In step S2030, the log preservation section 108 sets an area to be a masking target, based on the adjustment mode in the job setting and the paper sheet position in the analysis result. Next, the procedure shifts to step S2040.

S2040: Additional Printing?

In step S2040, the log preservation section 108 determines if the adjustment pattern and a different image overlap, that is, if it is additional printing, based on the adjustment pattern position in the analysis result.

In the case where the adjustment pattern and the different image do not overlap, that is, it is the additional printing (step S2040, Yes), the procedure shifts to step S2080, and in the case where the adjustment pattern and the different image overlap (step S2040, No), the procedure shifts to step S2050.

S2050: Image Formation Defect?

In step S2050, the log preservation section 108 determines if there is an image formation defect, based on the image formation defect position in the analysis result. In the case of the image formation defect (step S2050, Yes), the procedure shifts to step S2090 (masking exclusion), and in the case of no image formation defect (step S2050, No), the procedure shifts to step S2060 (masking processing).

S2060: Masking Processing

Figure 7:
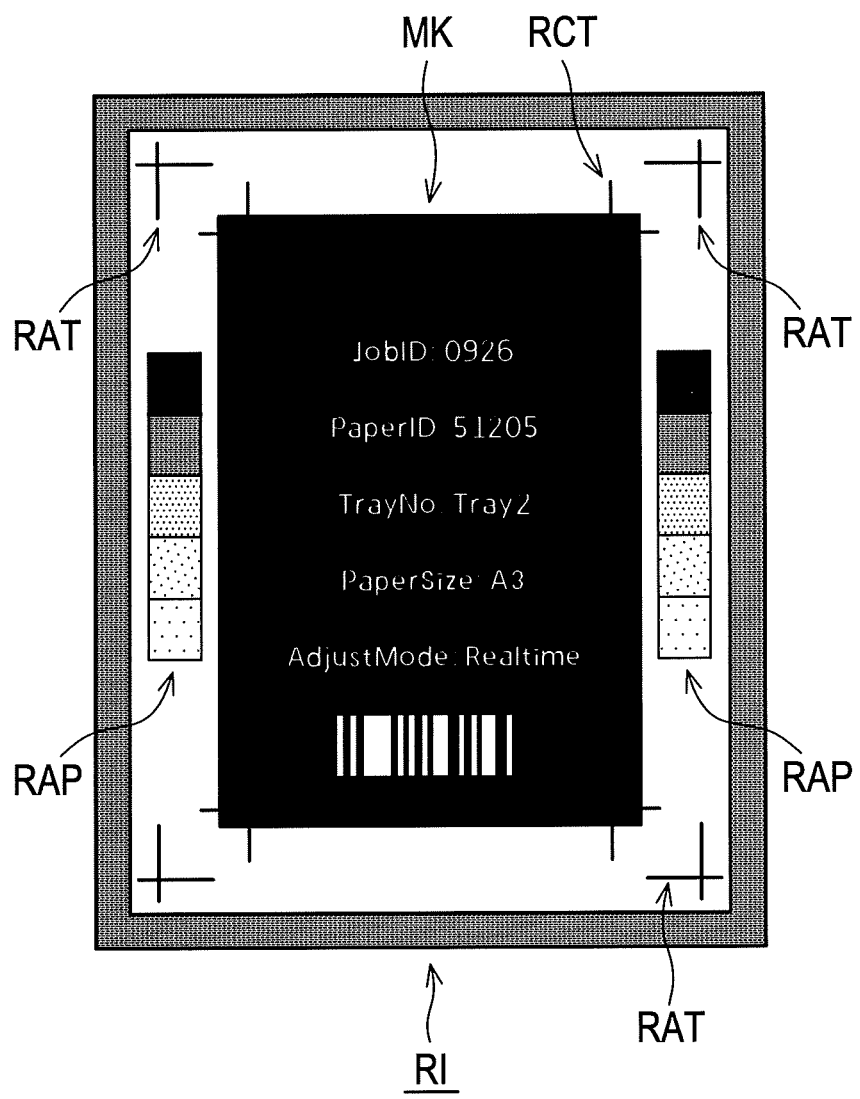
FIG. 7 is a diagram illustrating a masking processing example in a read image, similarly.

In step S2060, the log preservation section 108 blackens the masking area of the read image, based on a masking area table (illustrated in Table 4) and a masking exclusion area table (illustrated in Table 5) (see FIG. 7). Next, the procedure shifts to step S2070.

S2070: Embed Job Setting

In step S2070, the log preservation section 108 embeds the job setting in the masked area (see FIG. 7). Note that, upon embedding, characters can be directly embedded or a barcode can be embedded. After the processing of step S2070, the procedure is ended.

S2080: Set Additional Printing Masking

In step S2080, the log preservation section 108 determines if the image other than the adjustment pattern is present in an area outside the user content, and in the case of determining that it is an additional printing image (see FIG. 8), adds the image to the masking area table as the masking target (illustrated in Table 4). Thereafter, the procedure shifts to step S2050 described above.

S2090: Exclude Defective Part Masking

Figure 9:
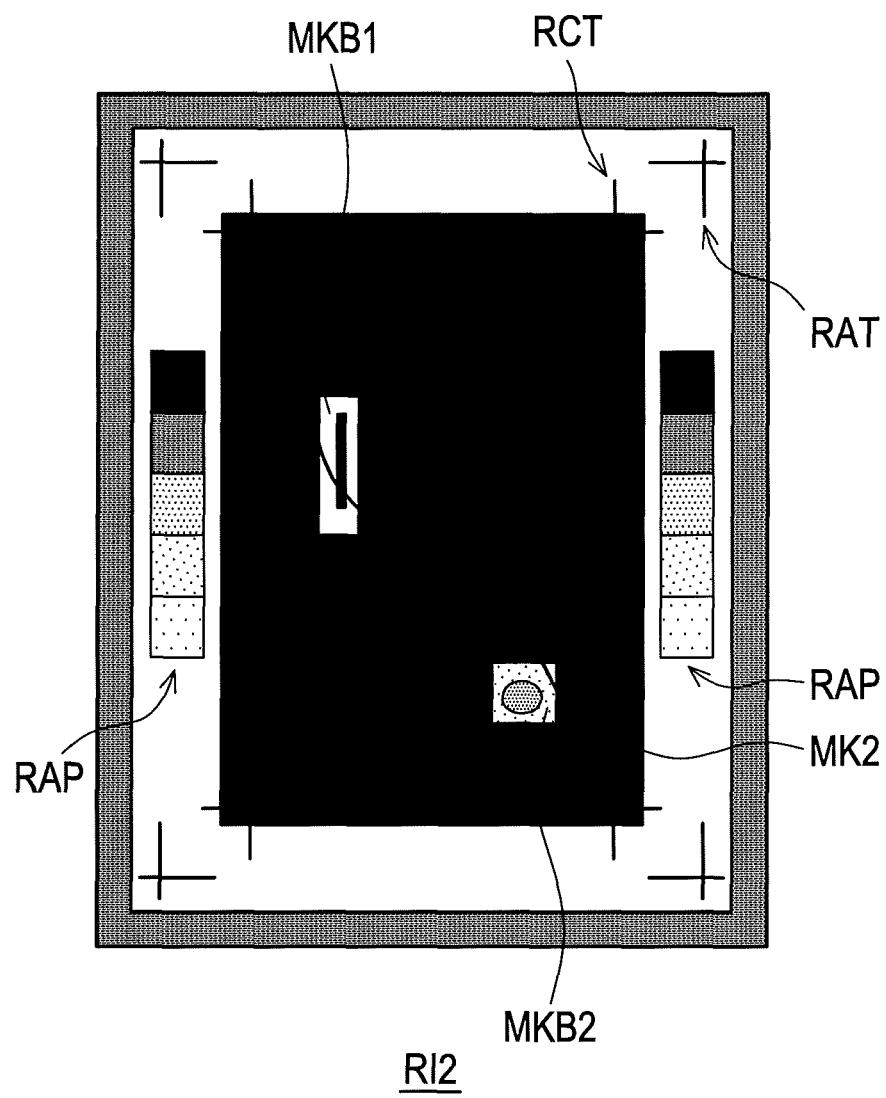
FIG. 9 is a diagram illustrating a masking exclusion example of an image formation defective part, similarly.

In step S2090, when it is determined that there is the image formation defect, the log preservation section 108 excludes a pertinent area from the masking target from the defect position and size (see FIG. 9). A masking exclusion area and a defect type are added to the masking exclusion area table (Table 5). Thereafter, the procedure shifts to step S2060 described above.

Figure 5:
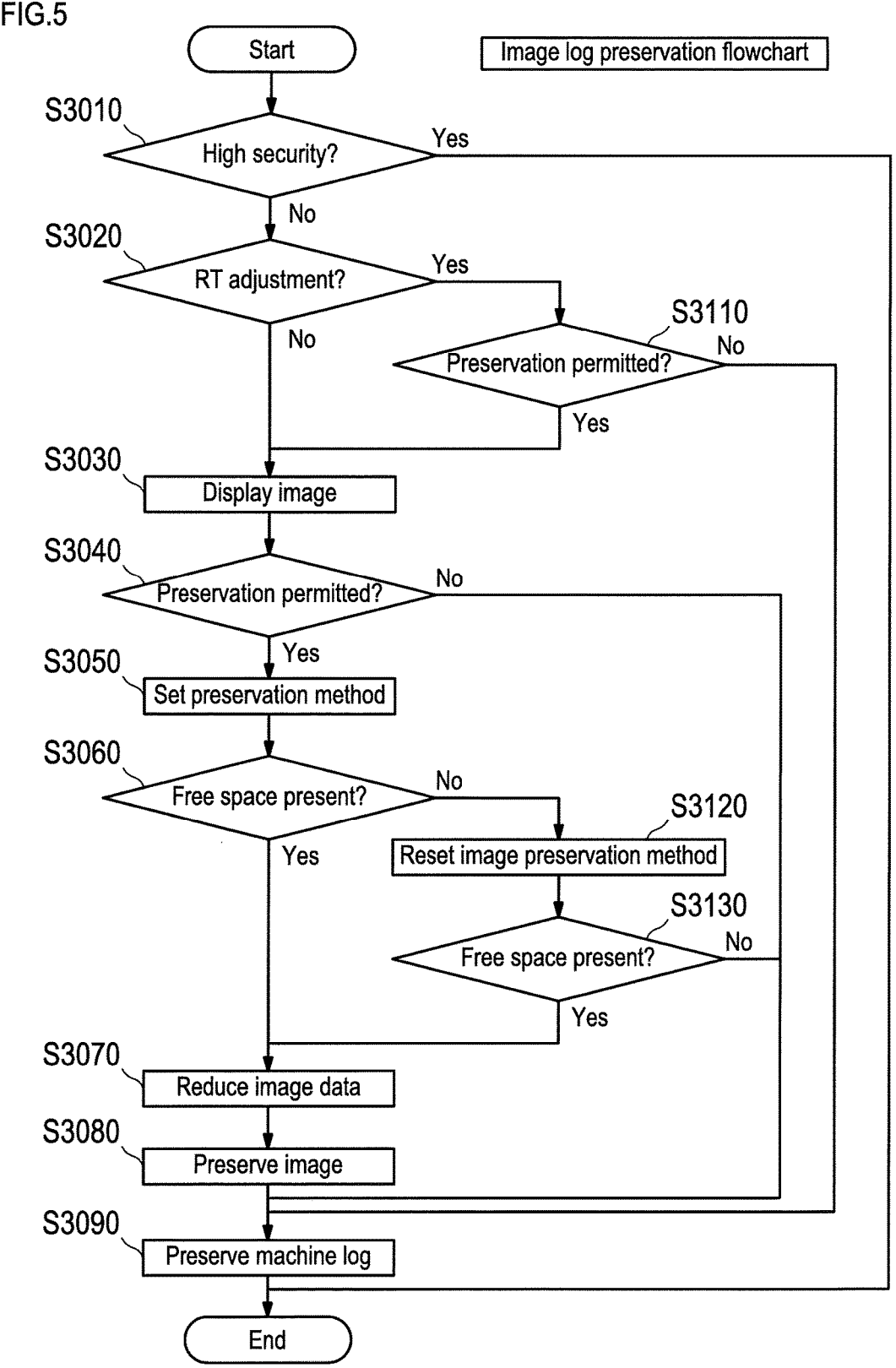
FIG. 5 is a flowchart illustrating a procedure of image log preservation, similarly.

Next, the procedure of image log preservation will be described based on a flowchart in FIG. 5. The following procedure is executed by the control of the control section.

S3010: High Security?

As the procedure is started, the log preservation section 108 acquires high security mode setting (Table 1) from the state management section 101, and determines if a high security mode=ON. In the case where the high security mode is ON (step S3010, Yes), the procedure is ended without preserving the read image. In the case where the high security mode is OFF (step S3010, No), the procedure shifts to step S3020. Note that, in the present embodiment, the processing is changed depending on whether the high security mode is ON or OFF, but processing content can be changed according to a level (high or low, or high, middle or low) of security.

S3020: RT Adjustment?

In step S3020, the log preservation section 108 determines if the read image is the image of the real time adjustment. In the case of the real time adjustment (step S3020, Yes), the procedure shifts to step S3110, and in the case where it is not the real time adjustment (step S3020, No), the procedure shifts to step S3030.

S3030: Display Image

In step S3030, the log preservation section 108 notifies the state management section 101 of the memory address of the read image, displays the read image and a preservation permission button/preservation inhibition button at the operation display section 210, and urges a user to select one of the buttons. Note that the user can be made to select the masking area. Next, the procedure shifts to step S3040.

S3040: Preservation Permitted?

In step S3040, the log preservation section 108 determines if the button selected by the user is the preservation permission button. In the case where the preservation inhibition button is selected (step S3040, preservation permission; No), the read image is not preserved and the procedure shifts to step S3090. In the case where the preservation permission button is selected (step S3040, preservation permission; Yes), the procedure shifts to step S3050.

S3050: Set Preservation Method

In step S3050, the log preservation section 108 sets a preservation method of the read image according to the adjustment mode. As illustrated in an image preservation setting table (Table 2), normal preservation and reduced preservation are set for each adjustment mode, and normal preservation setting corresponding to the adjustment mode is set as read image preservation setting. A resolution and a compression system can be changed depending on a kind of the storage device 216 to be a preservation destination (example: changing depending on a communication band with a server). Next, the procedure shifts to step S3060.

S3060: Free Space Present?

In step S3060, the log preservation section 108 calculates a required capacity in the case of preserving the read image by the normal preservation setting. If a free space of the storage device 216 exceeds the required capacity is determined. In the case where the free space of the storage device 216 exceeds the required capacity (step S3060, Yes), the procedure shifts to step S3070, and in the case where the free space of the storage device 216 does not exceed the required capacity (step S3060, No), the procedure shifts to step S3120.

S3070: Reduce Image Data

In step S3070, the log preservation section 108 resolution-converts/compresses the read image, based on the read image preservation setting. Next, the procedure shifts to step S3080. Note that, in the case where the free space exceeds the required capacity, it is possible not to reduce an image data amount, or the level of compression can be changed depending on the capacity to be free after preservation with free space presence.

S3080: Preserve Image

In step S3080, the log preservation section 108 ciphers the compressed read image and then preserves the read image in the storage device 216. A ciphering method is not limited in particular and can be an appropriate method. The storage device 216 to be the preservation destination can be a removable device such as a USB memory, or a server on a network. In addition, cipher strength of the read image can be increased from the machine log. Furthermore, it is also possible not to perform ciphering processing. Next, the procedure shifts to step S3090.

S3090: Preserve Machine Log

In step S3090, the log preservation section 108 acquires machine state information from the state management section 101, ciphers the information as the machine state log, and preserves the machine state log in the storage device 216. Thereafter, the procedure is ended.

S3110: Preservation Permitted?

In step S3110, in the case where the read image is the image of the real time adjustment, the log preservation section 108 acquires real time adjustment image preservation setting (Table 1) from the state management section 101, and determines if the preservation setting=permitted. In the case of the preservation setting=inhibited (step S3110, No), the read image is not preserved and the procedure shifts to step S3090 of preserving the machine log. In the case of the preservation setting=permitted (step S3110, Yes), the procedure shifts to step S3030.

S3120: Reset Image Preservation Method

In step S3120, in the case where the free space of the storage device 216 is smaller than the required capacity, the log preservation section 108 resets the reduced preservation setting in the image preservation setting table (Table 2) as the read image preservation setting. Note that, while an example of changing a resolution is illustrated, the capacity can be also reduced by changing a compressibility of the image. In addition, it is possible to preserve the image formation defective part by a high resolution and preserve the other part by a low resolution. Next, the procedure shifts to step S3130.

S3130: Free Space Present?

In step S3130, the log preservation section 108 calculates the required capacity in the case of preserving the read image by the reduced preservation setting. Whether the free space of the storage device 216 exceeds the required capacity is determined. In the case where the free space is not present (step S3130, No) and is smaller than the required capacity, the read image is not preserved and the procedure shifts to step S3090 of preserving the machine log. In the case where the free space is present (step S3130, Yes), the procedure shifts to step S3070.

Figure 6:
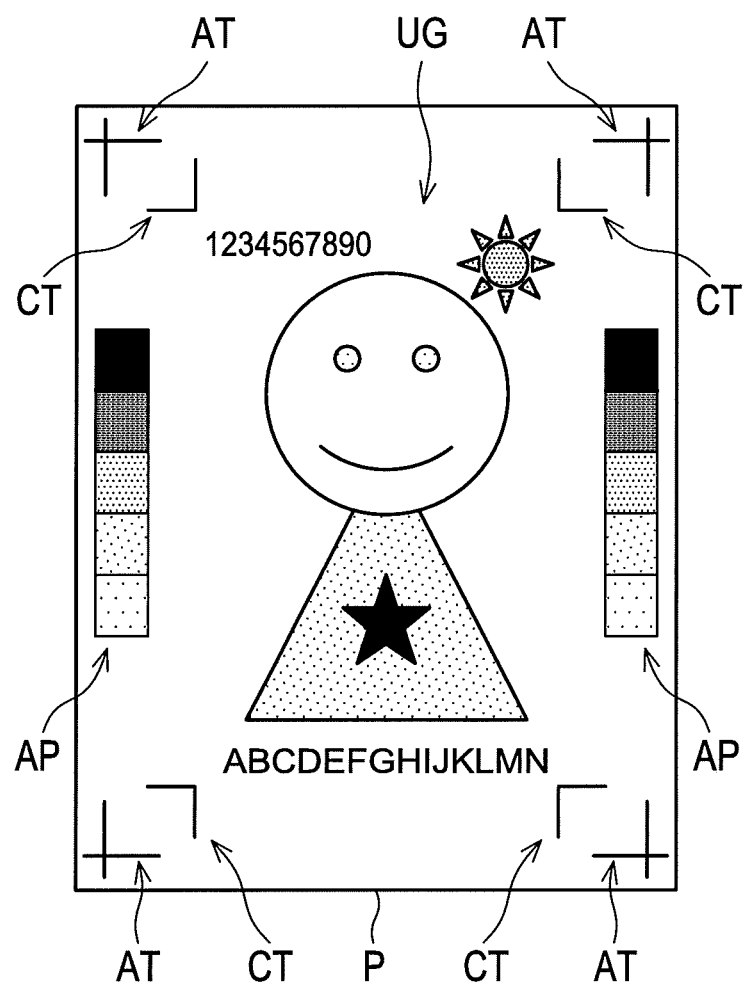
FIG. 6 is a diagram illustrating a printing example of a paper sheet used in real time adjustment, similarly.

Next, an example of the paper sheet to perform the real time adjustment is illustrated in FIG. 6.

On a paper sheet P, an image UG of the user content, a patch AP for the adjustment, a cross register mark AT for the adjustment, and a cutting register mark CT indicating a cutting margin are formed. The cross register mark AT is formed in the cutting margin indicated by the cutting register mark CT. When the paper sheet P is read by the line sensor 221, the image including the user content UG is obtained as the read image. Note that, even when it is not the real time adjustment, in the case of reading the image of the entire paper sheet, the similar read image is obtained.

FIG. 7 illustrates a masked read image RI. The read image RI includes a patch image RAP for which the patch AP for the adjustment is read, a cross register mark image RAT for which the cross register mark AT is read, and a cutting register mark image RCT for which the cutting register mark CT is read, but the image UG of the user content is not displayed and a mask MK is displayed in the area. The masking processing can be performed after the adjustment and the determination of the abnormality are performed based on the read image RI, or the masking processing can be performed before the processing. In addition, in the present embodiment, an image formation condition is embedded in the mask MK. As the image formation condition, a job ID, a paper sheet ID, a tray number, a paper sheet size, the adjustment mode: real time, and a barcode including the information are embedded. Note that, as the present invention, whether to embed the image formation condition in the masking area can be arbitrarily set.

Figure 8:
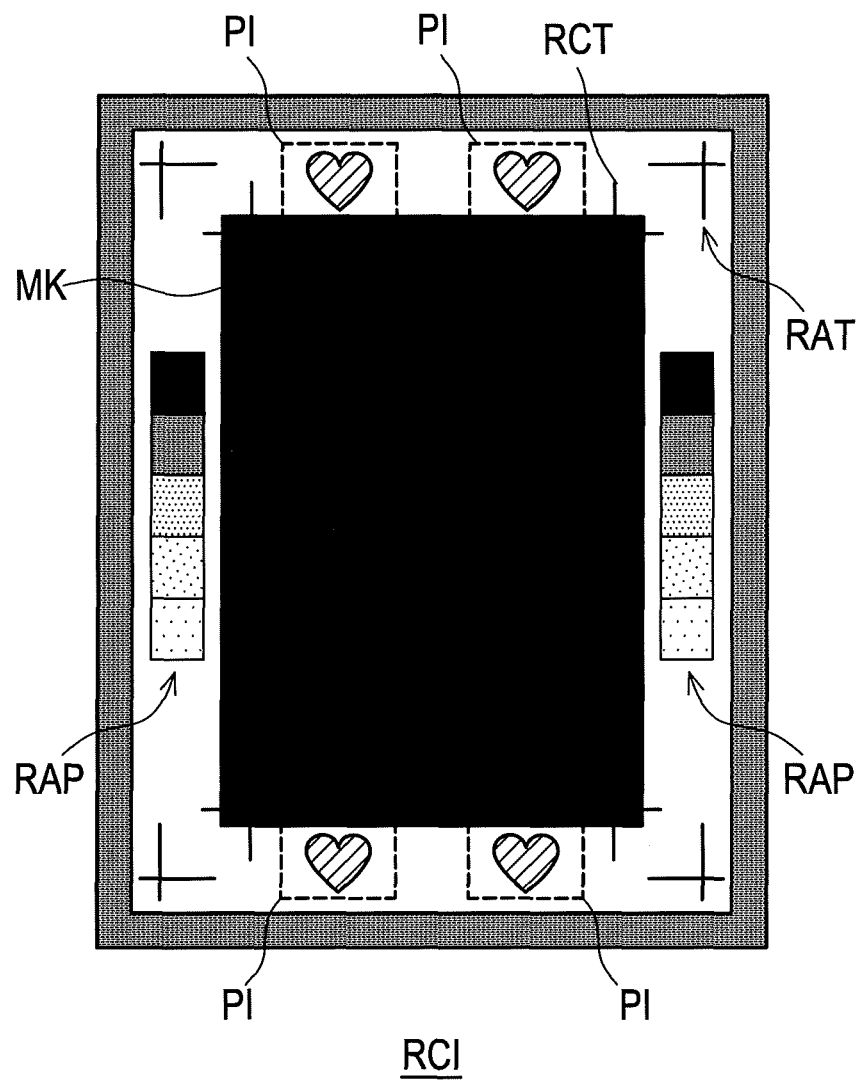
FIG. 8 is a diagram describing addition of a masking area in additional printing, similarly.

FIG. 8 illustrates a read image RCI for which an additionally printed paper sheet is read. The read image RCI includes the patch image RAP, the cross register mark image RAT, and the cutting register mark image RCT, and the mask MK is arranged in an area to be the user content. In the case where the image other than the adjustment image is present in the area outside the user content, it is turned to the masking area. In FIG. 8, an image PI is present as the different image other than the adjustment image in the area outside the user content, and is turned to the masking target. In the case of the additional printing, the different image is a preceding image.

FIG. 9 illustrates a read image RI2 in the case where there is the abnormality of the image in the area of a mask MK2 masking the user content. The read image RI2 includes the patch image RAP, the cross register mark image RAT for which the cross register mark AT is read, and the cutting register mark image RCT. In the area of the mask MK2, a scratch positioned at a left side center and a density irregularity positioned at a right side lower part are present, and in order to confirm the abnormality of the image, the area is set to the mask exclusion area, and the abnormality of the image can be analyzed in a minimum range.

Embodiment 2

Figure 10:
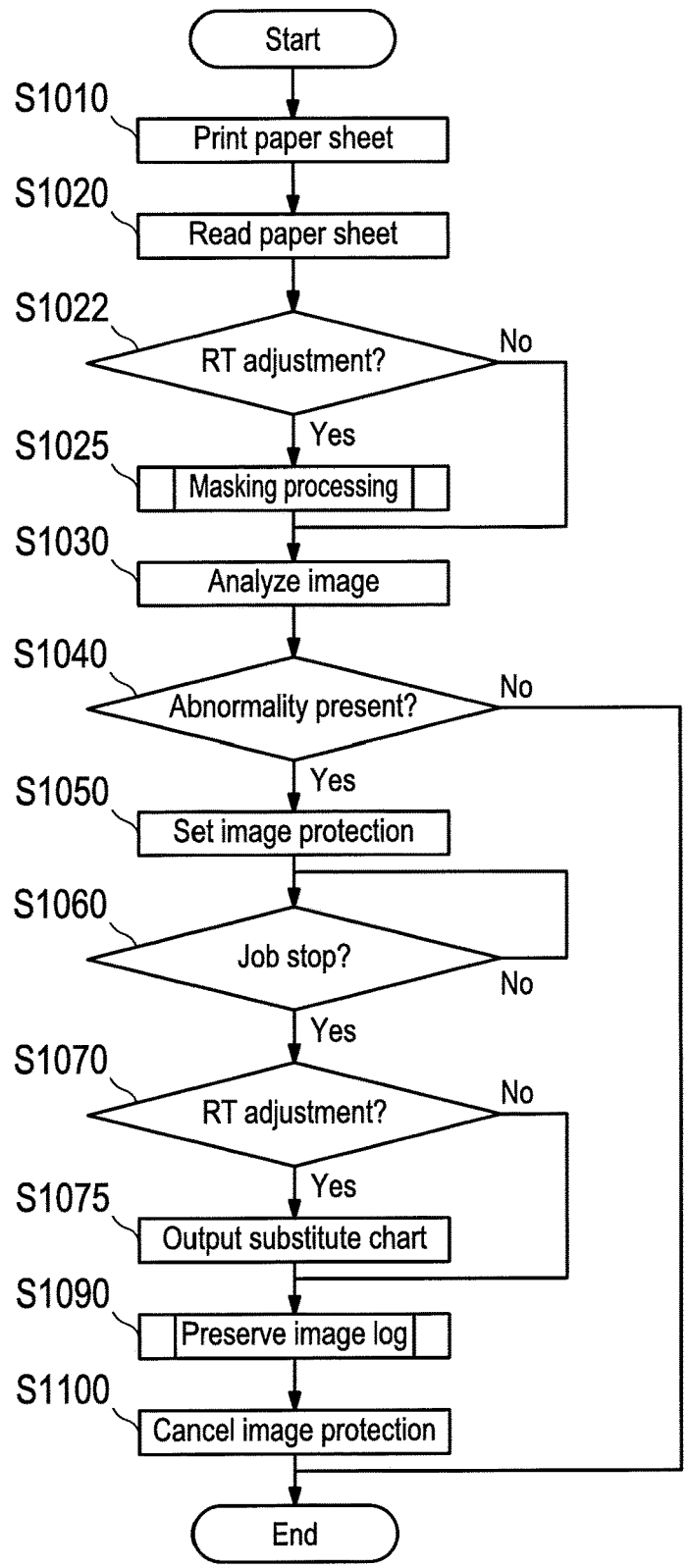
FIG. 10 is a flowchart illustrating a procedure from the image formation to the image read and the masking processing in an embodiment 2 of the present invention.

Next, the procedure of the image formation and the image read in the other embodiment will be described based on a flowchart in FIG. 10. Note that the following procedure is executed by the control of the control section. In addition, the procedure of the flowchart hereinafter is operated according to the setting content indicated in Tables 1 to 6 to be described later.

S1010: Print Paper Sheet

The content of the step is the same as the above-described embodiment, and the description is omitted.

S1020: Read Paper Sheet

In step S1020, the image adjustment section 104 instructs the read section 105 to read the paper sheet on which the image is formed in step S1010. The read section 105 reads the conveyed paper sheet by the line sensor 221, and stores the read image in the memory. When the storage of the read image in the memory is completed, the read section 105 notifies the image adjustment section 104 of the read completion. Next, the procedure shifts to step S1022.

S1022: RT Adjustment?

In step S1022, the log preservation section 108 determines if the read image is the image of the real time adjustment. In the case of the real time adjustment (step S1022, Yes), the procedure shifts to step S1025, and in the case where it is not the real time adjustment (step S1022, No), the procedure shifts to step S1030.

S1025: Masking Processing

In step S1025, the log preservation section 108 blackens the masking area of the read image, based on the masking area table (Table 4) and the masking exclusion area table (Table 5) (FIG. 7). The content of the masking processing will be described later. Next, the procedure shifts to step S1030.

S1030: Analyze Image

S1040: Abnormality Present?

S1050: Set Image Protection

S1060: Job Stop?

The content of the steps described above is the same as the above-described embodiment, and the description is omitted.

S1070: RT Adjustment?

In step S1070, the log preservation section 108 determines if the adjustment mode is the real time adjustment. When it is not the real time adjustment (step S1070, No), the procedure shifts to step S1090, and when it is the real time adjustment (step S1070, Yes), the procedure shifts to step S1075.

S1075: Output Substitute Chart

In step S1075, the log preservation section 108 instructs the state management section 101 to output a substitute chart for which only the internal pattern not including the user content is printed, in the case where the adjustment mode is the real time adjustment. The state management section 101 instructs the image formation section 204 to form the image of the substitute chart on the paper sheet, and instructs the read section 105 to read the paper sheet on which the substitute chart is printed. Thus, the adjustment of the image formation section can be performed after the job is stopped. Next, the procedure shifts to step S1090.

S1090: Preserve Image Log

S1100: Cancel Image Protection

The content of the steps described above is the same as the above-described embodiment, and the description is omitted.

Figure 11:
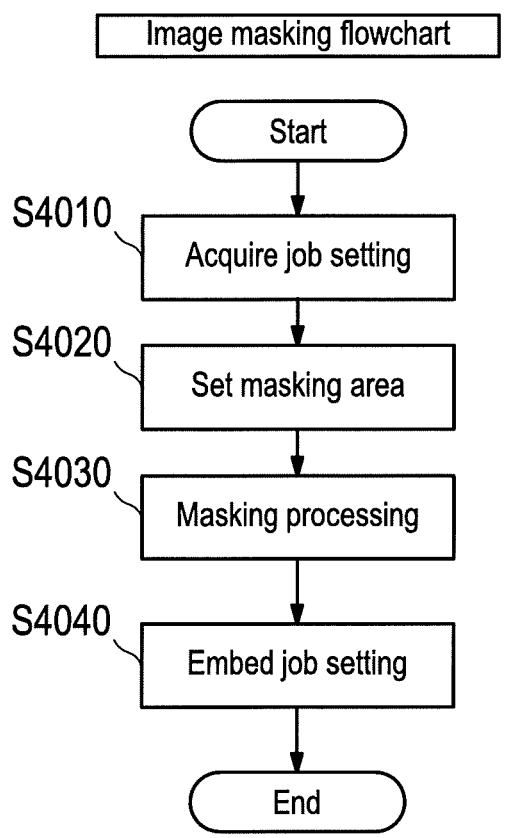
FIG. 11 is a flowchart illustrating a procedure in the masking processing, similarly.

Next, the procedure of image masking will be described based on a masking flowchart in FIG. 11. Note that the following procedure is executed by the control of the control section.

S4010: Acquire Job Setting

As the procedure is started, in step S4010, the read section 105 acquires the job setting of the paper sheet corresponding to the read image from the state management section 101. The job setting includes the paper sheet size, the post-processing setting, and the adjustment mode or the like. Next, the procedure shifts to step S4020.

S4020: Set Masking Area

In step S4020, the read section 105 calculates a user content position on chart design, based on the adjustment mode of the job setting, and sets the area to be the masking target. Next, the procedure shifts to step S4030.

S4030: Masking Processing

In step S4030, the read section 105 blackens the masking area of the read image based on the masking area table (Table 4) (FIG. 7). Next, the procedure shifts to step S4040.

S4040: Embed Job Setting

In step S4040, the read section 105 embeds the job setting in the masked area (FIG. 7), and the procedure is ended thereafter.

Figure 12:
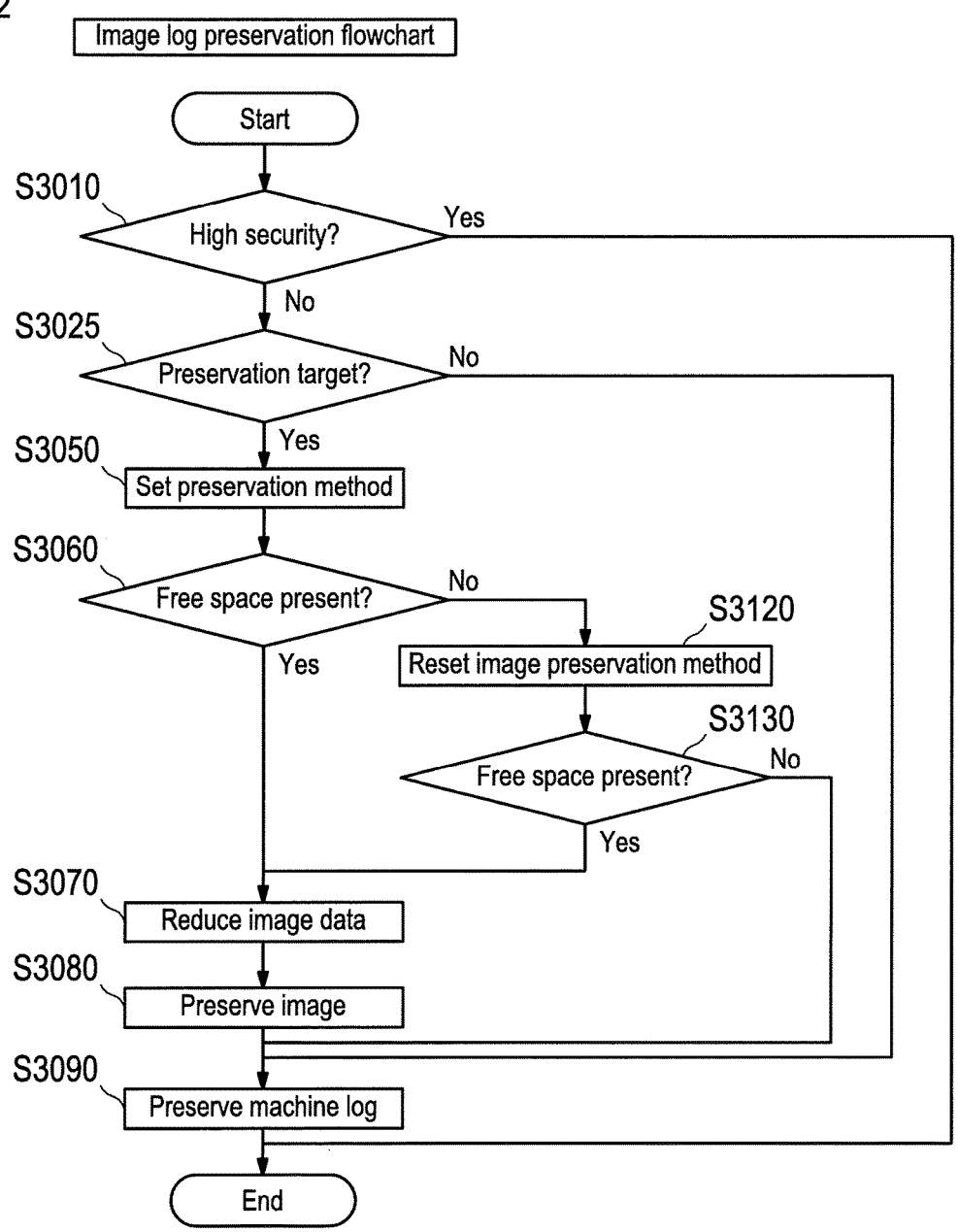
FIG. 12 is a flowchart illustrating a procedure of the image log preservation, similarly.

Next, the procedure of the image log preservation will be described based on an image flowchart in FIG. 12. Note that the following procedure is executed by the control of the control section.

S3010: High Security?

As the procedure is started, the log preservation section 108 acquires the high security mode setting (Table 1) from the state management section 101, and determines if the high security mode=ON. In the case where the high security mode is ON (step S3010, Yes), the procedure is ended without preserving the read image. In the case where the high security mode is OFF (step S3010, No), the procedure shifts to step S3025. Note that, in the present embodiment, the processing is changed depending on whether the high security mode is ON or OFF, but the processing content can be changed according to the level of the security. Next, the procedure shifts to step S3025.

S3025: Preservation Target?

In step S3025, the log preservation section 108 refers to a preservation target error setting table (Table 6), and determines if it is the read image in which an error is generated to be a preservation target. In the case where it is not the preservation target (step S3025, No), the procedure shifts to step S3090 of preserving the machine log, and in the case where it is the preservation target (step S3025, Yes), the procedure shifts to step S3050.

S3050: Set Preservation Method

In step S3050, the log preservation section 108 sets the preservation method of the read image according to the adjustment mode. As illustrated in the image preservation setting table (Table 2), the normal preservation and the reduced preservation are set for each adjustment mode, and the normal preservation setting corresponding to the adjustment mode is set as the read image preservation setting. The resolution and the compression system can be changed depending on the kind of the storage device 216 to be the preservation destination (example: changing depending on the communication band with the server). Next, the procedure shifts to step S3060.

S3060: Free Space Present?
S3070: Reduce Image Data
S3080: Preserve Image
S3090: Preserve Machine Log
S3120: Reset Image Preservation Method
S3130: Free Space Present?

The content of the steps described above is the same as the above-described embodiment, and the description is omitted.

TABLE 1

Machine operation setting table

| Setting item | Current setting value | Settable value |
| --- | --- | --- |
| Real time adjustment image preservation | Permitted | Permitted/inhibited |
| Substitute image output mode | OFF | ON/OFF |
| High security mode | OFF | ON/OFF |

TABLE 2

Image preservation setting table

| Adjustment mode | Normal preservation setting | | Reduced preservation setting | |
| --- | --- | --- | --- | --- |
| | Preservation resolution | Compression form | Preservation resolution | Compression form |
| Front and back position correction | 400 | PNG | 200 | PNG |
| Real time adjustment | 400 | PNG | 100 | JPEG |
| Density balance correction | 200 | PNG | 100 | JPEG |
| Color correction | 300 | PNG | 100 | JPEG |
| Line width correction | 600 | PNG | 300 | PNG |

TABLE 3

Read image management list

| Image ID | Memory address | Protection setting | Adjustment mode | Paper sheet size |
| --- | --- | --- | --- | --- |
| 1 | 1000 | Unprotected | Front and back position correction | A4 |
| 2 | 2000 | Protected | Real time adjustment | A3 |
| 3 | 3000 | Unprotected | Color correction | A3 |

TABLE 3-continued

Read image management list

| Image ID | Memory address | Protection setting | Adjustment mode | Paper sheet size |
|---|---|---|---|---|
| 4 | 4000 | Unprotected | Line width correction | A4 |
| 5 | 5000 | Unprotected | Density balance correction | A4 |

TABLE 4

Masking area table

| Area No. | Start X coordinate | Start Y coordinate | End X coordinate | End Y coordinate | Reason for setting |
|---|---|---|---|---|---|
| 1 | 235 | 266 | 3327 | 4692 | User content |
| 2 | 240 | 4958 | 3332 | 9650 | User content |
| 3 | 654 | 68 | 843 | 266 | Additional printing |
| 4 | 2681 | 71 | 2910 | 266 | Additional printing |

TABLE 5

Masking exclusion area table

| Area No. | Start X coordinate | Start Y coordinate | End X coordinate | End Y coordinate | Defect type |
|---|---|---|---|---|---|
| 1 | 723 | 2456 | 894 | 3402 | Scratch |
| 2 | 2724 | 3692 | 3169 | 4058 | Density irregularity |

TABLE 6

Preservation target error setting table

| Error type | Preservation setting |
|---|---|
| Paper sheet area detection failure | Target |
| Register mark detection failure | Target |
| Density patch detection failure | Target |
| User content scratch | Non-target |
| User content density irregularity | Non-target |

Note that, in the respective embodiments described above, it is assumed that the read image is acquired and the determination of the abnormality and the masking processing are performed in the image formation device, however, the read image can be acquired and the determination of the abnormality and the masking processing can be performed for the read image in the management device that manages the image formation device. In that case, a management device control section included in the management device functions as the control section of the present invention.

According to the present embodiment, in the case where the user content is included in the read image for which the image formed on the transfer medium is read, whether to perform the masking processing can be determined according to the situation, the masking processing can be performed in the situation where it is needed, and generation of a security problem can be avoided even when the read image is sampled.

While the present invention is described above based on the above-described embodiments, the present invention is not limited to the content of the above description, and appropriate changes in the above-described embodiments are possible without deviating from the scope of the present invention.

Although embodiments of the present invention have been described and illustrated in detail, the disclosed embodiments are made of purposes of illustration and example only and not limitation. The scope of the present invention should be interpreted by terms of the appended claims.

What is claimed is:

1. An image formation device comprising:
   an image formation section that forms an image on a transfer medium; and
   a control section that acquires a read image for which the image formed on the transfer medium is read,
   wherein:
   the control section has a function of determining abnormality regarding the read image, and a function of performing masking processing on the read image in a case where user content is included in the read image;
   the control section determines whether to perform the masking processing according to adjustment matter of the image formation section; and
   the control section defines a target to perform the masking processing, in a case where the adjustment matter in the image formation section is adjustment using a chart including the user content.

2. The image formation device according to claim 1, wherein the control section has an adjustment function of performing adjustment of the image formation section based on the read image.

3. The image formation device according to claim 2, wherein the control section forms an adjustment image on the transfer medium by the image formation section, for the adjustment.

4. The image formation device according to claim 1, wherein the control section determines abnormality of an image based on the read image.

5. An image formation device comprising:
   an image formation section that forms an image on a transfer medium; and
   a control section that acquires a read image for which the image formed on the transfer medium is read,
   wherein:
   the control section has a function of determining abnormality regarding the read image, and a function of performing masking processing on the read image in a case where user content is included in the read image; and
   the control section performs the masking processing in a case where the abnormality is determined based on the read image.

6. An image formation device comprising:
   an image formation section that forms an image on a transfer medium; and
   a control section that acquires a read image for which the image formed on the transfer medium is read,
   wherein:
   the control section has a function of determining abnormality regarding the read image, and a function of performing masking processing on the read image in a case where user content is included in the read image; and
   the control section determines the abnormality regarding the read image after performing the masking processing on the read image.

7. The image formation device according to claim 1, wherein the control section specifies an image position on the transfer medium for the read image when determining the abnormality, and sets a masking position based on the image position when the masking processing.

8. The image formation device according to claim 1, wherein the control section determines, in a case where there is a different image other than the image formed in the image formation section, a position of the different image on the transfer medium, and masks an area where the different image is formed based on the position of the different image at the time of the masking processing.

9. The image formation device according to claim 1,
wherein an adjustment image is formed by the image formation section on the transfer medium to be read, and
wherein the control section determines a position of the different image in a case where a different image other than the adjustment image is detected in the read image, and masks an area where the different image is formed based on a determination result at the time of the masking processing.

10. The image formation device according to claim 8, wherein the different image is a preceding image in additional printing.

11. The image formation device according to claim 1, wherein, in a case where there is abnormality of the image on the transfer medium based on the read image, the control section detects a position of the abnormality of the image, and excludes the position of the abnormality of the image from a target of the masking processing when performing the masking processing.

12. The image formation device according to claim 1, wherein the control section embeds an image formation condition in a masking area when performing the masking processing.

13. The image formation device according to claim 1, comprising
a display section,
wherein, in a case where the masking processing is performed, the control section displays a masked image or/and an image turned to a masking target at the display section.

14. The image formation device according to claim 1, wherein, in a case where abnormality presence is determined, the control section stops output of a job.

15. The image formation device according to claim 1, wherein, in a case where an adjustment kind of adjusting the image formation section uses a chart including user content and a job is stopped due to determination of abnormality presence, the control section prints an internal pattern on the transfer medium, and acquires a read image of the transfer medium on which the internal pattern is printed for the adjustment.

16. The image formation device according to claim 1, comprising
an image preservation section,
wherein, in a case of determining that there is the abnormality regarding the read image, the control section preserves the read image or/and the image on which the masking processing is performed in the image preservation section.

17. The image formation device according to claim 15, wherein the control section determines whether to preserve the image according to a type of the abnormality.

18. The image formation device according to claim 16, wherein the control section determines whether to preserve the image according to a type of adjustment when executing an adjustment function of performing adjustment of the image formation section.

19. The image formation device according to claim 16, comprising
an image preservation setting section that sets permission or inhibition of image preservation including user content,
wherein the control section does not preserve the image in the image preservation section in a case where the image preservation including the user content is inhibited.

20. The image formation device according to claim 16, wherein the control section does not preserve the read image in the image preservation section in a relatively high security mode.

21. The image formation device according to claim 16, wherein the control section determines whether to preserve the read image in the image preservation section according to a level of security in a relatively high security mode.

22. The image formation device according to claim 16, comprising
an operation section,
wherein, in a case where an operation of preservation permission is performed through the operation section, the control section preserves the read image or/and the image on which the masking processing is performed in the image preservation section.

23. The image formation device according to claim 16, wherein the control section preserves a machine information log together when preserving the read image or/and the image on which the masking processing is performed in the image preservation section.

24. The image formation device according to claim 16, wherein the control section ciphers and preserves the image when preserving the image in the image preservation section.

25. The image formation device according to claim 16, wherein the control section compresses and preserves the image when preserving the image in the image preservation section.

26. The image formation device according to claim 16, wherein the control section confirms if a preservation capacity in the image preservation section is sufficient when preserving the image, and preserves the image in the image preservation section in a case of determining that the capacity is sufficient.

27. The image formation device according to claim 16, wherein, in a case where a preservation capacity in the image preservation section is not sufficient when preserving the image, the control section reduces a data amount of the image and preserves the image in the image preservation section.

28. The image formation device according to claim 27, wherein, in a case of executing an adjustment function of performing adjustment of the image formation section, the control section reduces the data amount of the image according to an adjustment type of image formation adjustment.

29. The image formation device according to claim 16, wherein the control section sets a deletion inhibition flag to the read image for which abnormality presence is determined, and the image preservation section preserves the read image or/and the image on which the masking processing is performed after a job is stopped.

30. An image formation system comprising the image forming device of claim 1.

31. An image formation method comprising:
   forming an image on a transfer medium with an image formation section; and
   acquiring a read image for which the image formed on the transfer medium is read,
   determining abnormality regarding the read image, and performing masking processing on the read image in a case where user content is included in the read image;
   determining whether to perform the masking processing according to adjustment matter in the image formation section; and
   defining a target to perform the masking processing, in a case where the adjustment matter in the image formation section is adjustment using a chart including the user content.

32. A non-transitory computer readable recording medium storing a program to be executed in a computer, the program causing the computer to perform the method according to claim 31.

33. An image formation method comprising:
   forming an image on a transfer medium;
   acquiring a read image for which the image formed on the transfer medium is read;
   determining abnormality regarding the read image, and performing masking processing on the read image in a case where user content is included in the read image; and
   performing the masking processing in a case where the abnormality is determined based on the read image.

34. An image formation method comprising:
   forming an image on a transfer medium;
   acquiring a read image for which the image formed on the transfer medium is read;
   determining abnormality regarding the read image, and performing masking processing on the read image in a case where user content is included in the read image; and
   determining the abnormality regarding the read image after performing the masking processing on the read image.

35. A non-transitory computer readable recording medium storing a program to be executed in a computer, the program causing the computer to perform the method according to claim 33.

36. A non-transitory computer readable recording medium storing a program to be executed in a computer, the program causing the computer to perform the method according to claim 34.

* * * * *